Patented June 16, 1953

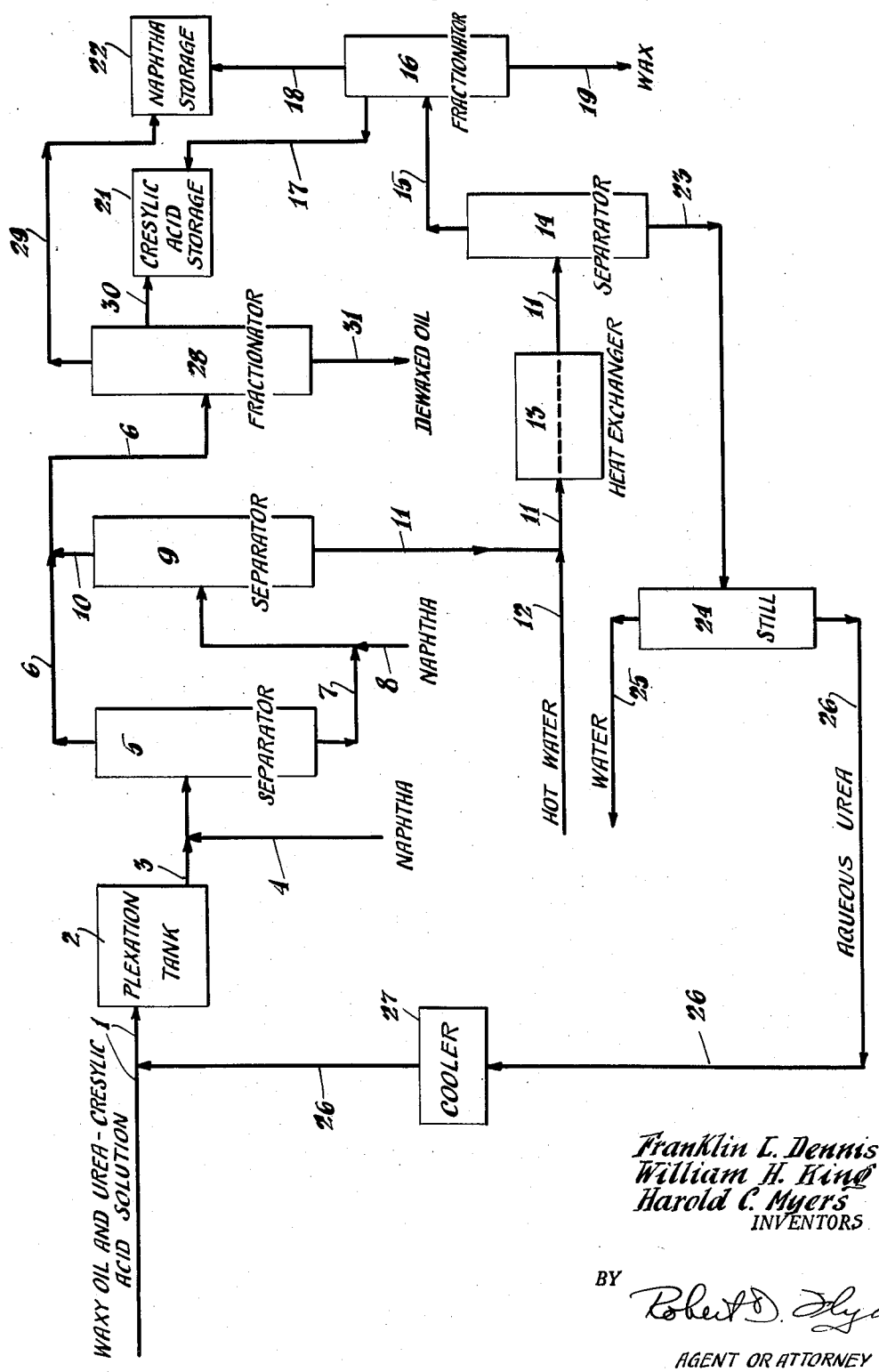

2,642,379

UNITED STATES PATENT OFFICE 2,642,379

SEPARATION OF WAX AND ASPHALT FROM HYDROCARBON OIL

Franklin L. Dennis, Clayton, and William H. King and Harold C. Myers, Woodbury, N. J., assignors to Socony-Vacuum Oil Company, Incorporated, a corporation of New York Application September 13, 1949, Serial No. 115,444

3 Claims. (Cl. 196—17)

This invention has to do with the separation of hydrocarbon and hydrocarbon derivatives of different molecular configuration from mixtures containing the same.

I. FIELD OF INVENTION

Numerous processes have been developed from the separation of hydrocarbons and hydrocarbon derivatives of different molecular configuration by taking advantage of their selective solubility in selected reagents or solvents from which they may later be separated. Exemplary of hydrocarbon separation procedures is the Edeleanu process, wherein paraffinic materials are separated from aromatics by virtue of the greater solubility of aromatics in liquid sulfur dioxide. Lubricant oil solvent refining processes, solvent deasphalting, solvent dewaxing and the like are further examples of the separation of hydrocarbons of different molecular configuration. Typical of selective solvent procedures for separating hydrocarbon derivatives is the separation of paraffin wax, monochlorwax and polychlorwaxes, with acetone as the selective solvent.

This invention is concerned with the general field outlined above, but based upon a different and little-known phenomenon, namely the differing ability of hydrocarbons and hydrocarbon derivatives to enter into and to be removed from certain crystalline complexes. As used herein, the term "complex" broadly denotes a combination of two or more compounds.

This invention is predicated upon the knowledge that urea and thiourea form complex crystalline compounds to a varying degree with various forms of hydrocarbon and hydrocarbon derivatives.

II. PRIOR ART

For some years it has been known that various isomers of aromatic hydrocarbon derivatives form complexes with urea. Kremann (Monatshefte f. Chemie 28 1125 (1907)) observed that complexes, designated as "double compounds," of urea and the isomeric cresols are stable at different temperatures. Schotte and Priewe (1,830,859) later separated meta-cresol from the corresponding para isomer by selectively forming a meta-cresol-urea complex, which was described as an "addition compound"; the latter compound was separated from the para isomer and then split up by distillation or with water or acid to obtain pure meta-cresol. The "addition compound" of meta-cresol and urea was shown thereafter to have utility as a disinfectant (Priewe—1,933,757). Bentley and Catlow (1,980,901) found a number of aromatic amines containing at least one basic amino group capable of forming "double compounds" with certain isomeric phenols. It has also been shown that trans-oestradiol can be separated from the corresponding cis-compound by forming a difficultly soluble compound of urea and trans-oestradiol (Priewe—2,300,134).

The forces between urea and the compounds of the foregoing complexes are due to specific chemical interaction between the various functional groups.

One heterocyclic compound, 2:6 lutidine, has been found to form a crystalline compound with urea, thus affording a means of separating the lutidine from beta- and gamma-picolines (Riethof—2,295,606).

Comparatively few aliphatic hydrocarbon derivatives have been known to form complex compounds with urea. In German patent application B 190,197, IV d/12 (Technical Oil Mission, Reel 143; Library of Congress, May 22, 1946), Bengen described a method for the separation of aliphatic oxygen-containing compounds (acids, alcohols, aldehydes, esters and ketones) and of straight chain hydrocarbons of at least six carbon atoms from mixtures containing the same, the method being predicated upon the ability of such compounds and hydrocarbons to form "additions—Produkt" with urea. A mixture containing such aliphatic compounds is contacted with a concentrated solution of urea in water, methanol, or ethanol, and the like. In the Technical Oil Mission translation of the Bengen application, however, the urea complexes were designated "adducts," which term apparently stems from the anglicized "addition product." The "adducts" are separated into their components, urea and straight chain hydrocarbon or aliphatic oxygen-containing compound, by heating or by the addition of methanol, water or an aqueous solution.

Thiourea has also been known to form complexes, perhaps the first of which is a complex with ethyl oxalate (Nencki, Berichte 7 780 (1874)). Recently, crystalline molecular complexes of thiourea and certain organic compounds were described by Angla (Compt. rendus 224, 402–4 and 1166 (1947)). The organic compounds recited include cyclic hydrocarbons such as cyclohexane, cyclohexene, polycyclic terpenes; halides, alcohols and ketones of such cyclic hydrocarbons; and halides of short chain paraffins. Crystalline molecular complexes of such compounds are dissociated by water and organic solvents to their components, thiourea and a compound of the foregoing type.

III. DEFINITIONS

From the foregoing discussion of prior art (II), it will be clear that a variety of terms have been applied to urea and thiourea complexes. The latter have been rather loosely described as "double compounds," "addition compounds," "difficultly soluble compounds," "Additions—Produkt," "adducts," and "crystalline molecular complexes." All of these terms are somewhat ambiguous in that they have also been used to describe products or complexes of different character than the urea complexes under consideration. This is particularly so with the term "adduct," and the related terms "unadducted material" and "non-adducted material." While the term "adduct" is simple and convenient, it is an unfortunate designation, inasmuch as it confuses these complexes with other substances known in the chemical art. Specifically, "adduct" has been applied to Diels-Alder reaction products, formed by reaction of conjugated diolefins and olefins and their derivatives. As is well known, Diels-Alder products, as a rule do not revert to their original constituents when heated or treated with water, acids, solvents, etc. Moreover, the term "adduct" has been defined earlier as "The product of a reaction between molecules, which occurs in such a way that the original molecules or their residues have long axes parallel to one another." (Concise Chemical and Technical Dictionary.) Further ambiguity is introduced by the term "adduction," which has been defined as "oxidation" (Hackh).

To avoid the foregoing conflicting terminology, several related terms have been coined to define with greater specificity the substances involved in the phenomenon under consideration. As contemplated herein and as used throughout the specification and appended claims, the following terms identify the phenomenon:

Plexad—a revertable associated complex comprising a plexor, such as urea, and at least one other compound; said plexad characterized by reverting or decomposing, under the influence of heat and/or various solvents, to its original constituents, namely, a plexor and at least one plexand.

Plexand—a compound capable of forming a plexad with a plexor, such as urea and thiourea; compounds of this character differ in their capacity to form plexads, depending upon various factors described hereinafter.

Antiplex—a compound incapable of forming a plexad with a plexor.

Plexor—a compound capable of forming a plexad with a plexand; such as urea and thiourea.

Plexate—to form a plexad.

Plexation—the act, process or effect of plexating.

IV. OUTLINE OF INVENTION

It has now been found that the separation procedures used hitherto can be improved substantially by the use of certain solvents with a plexor.

As indicated above, urea plexads and thiourea plexads have been formed by contacting a mixture containing a plexand and an antiplex, with urea or thiourea carried in water or an alcohol solution, whereupon a urea or thiourea plexad was formed. The plexad was then separated from the antiplex by decantation, filtration or similar means, and the plexad was decomposed into its components by heating or by contact with a suitable solvent.

Plexation procedures of the foregoing character, however, are relatively inefficient, inasmuch as an appreciable quantity of an antiplex generally is occluded with the plexad and remains in admixture with the plexand when the plexad is decomposed. This is particularly pronounced in the treatment of lubricating oil stocks, from which waxes are removed by plexation with urea. In addition to this shortcoming, it has been noted that the waxes so separated from residual-type lubricating oil stocks have considerable color, thus making necessary additional processing to reduce the color of such waxes. A further shortcoming resides in the relatively low degree of selectivity of aqueous and alcoholic media which carry the urea and thiourea plexors. With such media, only relatively small quantities of waxes are removed from lubricating oil stocks. Another important consideration in the treatment of lubricating oils with urea for removing waxes therefrom is the desirability of a low pour point of the treated oil (antiplex). It has been found that treatment with aqueous and alcoholic media containing urea or thiourea often leads to a treated oil of relatively high pour point.

The shortcomings of previous plexation procedures have now been overcome by using mixtures of cresylic acids, particularly mixtures containing substantial amounts of the para isomer, as the urea or thiourea solvent. In some manner, as yet not thoroughly understood, mixtures of cresylic acids cooperate with the plexor to provide a more effective plexation.

V. OBJECTS

It is an object of this invention, therefore, to provide an effective means for separating hydrocarbons and hydrocarbon derivatives of different molecular configuration from mixtures containing the same.

It is also an object of this invention to separate a plexad from an antiplex, and to provide a plexand substantially free of an antiplex. A more particular object is to separate a hydrocarbon wax from a lubricating oil stock, and to provide a substantially oil-free hydrocarbon wax characterized by a low degree of color. A corresponding object is the provision of a lubricating oil substantially free of hydrocarbon wax and/or of appreciably lower pour point than the untreated lubricating oil stock.

Another object of this invention is to separate paraffin wax and microcrystalline wax from mixtures thereof. Still another object is to fractionate hydrocarbon waxes from mixtures containing the same.

Another important object is the provision of a continuous method of separation of said plexands and antiplexes, which method is flexible, capable of relatively sharp separation, and not highly demanding of attention and of utilities such as heat, refrigeration, pumping power and the like.

Other objects and advantages of the invention will be apparent from the following description.

VI. INVENTION IN DETAIL

As indicated above, it has been found that the foregoing objects are achieved by plexation with urea or thiourea of a plexand or plexands, the urea or thiourea used being carried in a medium comprising cresylic acid mixtures.

(1) Plexands and mixtures suitable for plexation

The hydrocarbon mixtures and oxygen-containing paraffin mixtures mentioned in the discussion of the prior art, above, are contemplated herein. So also are the compounds, plexands, shown therein to have the capacity to form plexads. For example, when urea is used as a plexor, the mixture used may be: isomeric cresols (Kremann; Schotte and Priewe); oestradiols (Priewe); lutidine-picolines (Riethof); hydrocarbons containing straight chain hydrocarbons of at least six carbon atoms per molecule, and oxygen-containing mixtures containing straight chain acids, alcohols, aldehydes, esters and/or ketones having at least six carbon atoms per molecule (Bengen). It will be apparent from the definitions recited above, that the plexands of these mixtures are the compounds forming plexads with urea, and that the antiplexes are the compounds which do not form urea plexads.

Hydrocarbon mixtures containing n-paraffins in the range of $C_7$–$C_{30}$ and higher such as wax distillates, foots-oil, gas oils, virgin kerosenes, straight run naphthas are also suitable when urea is used as the plexor, such mixtures being shown in copending application Serial No. 4,997, filed January 29, 1948. Other mixtures shown in the latter application and also suitable here are: hydrocarbon mixtures containing n-paraffins and n-olefins, and prepared by synthesis of carbon monoxide and hydrocarbons, i. e., typical Fischer-Tropsch products prepared using cobalt and iron catalysts; cracked mixtures prepared by the vapor phase cracking of stocks rich in n-paraffins, such as by the cracking of paraffinic gas oils, foots-oil, crude waxes, etc.; mixtures containing straight chain oxygenated compounds, such as acids, alcohols, aldehydes and esters, and containing branched compounds, such as those obtained by synthesis with hydrogen and carbon monoxide over an iron catalyst or by oxidation of high molecular weight hydrocarbons; mixtures consisting essentially of n-paraffins and n-olefins, for the n-paraffins form stronger plexads than the n-olefins; mixtures consisting essentially of n-olefins with the double bond in various positions, for the olefins having the double bond near the end of the chain form stronger plexads than those having the double bond further from the end of the chain; hydrocarbon mixtures obtained by isomerization, alkylation, dehydrocyclization, dehydrogenation, etc.

Other mixtures which may be more effectively plexated with urea by the present process are those containing hydrocarbon derivatives and shown in application Serial No. 115,511, filed concurrently herewith. Typical of the mixtures described in the latter application are mixtures containing a straight chain halide having the halogen atom attached to a terminal carbon and having at least about five carbons in the chain. Mixtures containing compounds characterized by a nitrogen-containing substituent, are also advantageously plexated with the present process; such mixtures include amines, amides, nitriles, nitroparaffins, etc., and are described in application Serial No. 115,515, filed concurrently herewith, now abandoned. Sulfur-containing compounds present in various mixtures are also plexated efficiently herein; those are shown in application Serial No. 115,516, filed concurrently herewith. Compounds containing cyclic substituents, present in various mixtures, are also efficiently plexated with urea in the present process, being shown in application Serial No. 116,593, filed concurrently herewith. Plexation with urea of various terminally substituted compounds from mixtures containing the same and non-terminally substituted compounds, described in application Serial No. 115,517, filed concurrently herewith, is also aided materially by the present process.

Urea plexation of a non-terminally mono-substituted compound from mixtures containing the same and a non-terminally poly-substituted compound, described in application Serial No. 115,513, filed concurrently herewith, is also improved substantially by the present process. Similarly, more effective resolution with urea of mixtures containing paraffinic compounds of different degrees of unsaturation is realized herein; these mixtures are described in detail in applications Serial Nos. 115,514 and 115,518, filed concurrently herewith.

With regard to thiourea plexation, the mixtures shown in applications Serial Nos. 115,512 and 115,730, filed September 13 and 14, respectively, are suitable in the present process. In application Serial No. 115,512, highly branched paraffins and/or highly branched olefins are separated from straight chain or less highly branched compounds. In application Serial No. 115,730, certain cycloparaffins and/or cyclo-olefins are separated from mixtures of the same and other hydrocarbons.

(2) Plexor

The plexors used herein include urea and thiourea and, as indicated above, these plexors are used in solution in cresylic acid mixtures, particularly those containing appreciable amounts of p-cresol. This solution should range from partially saturated to supersaturated at the temperature at which it is contacted with a plexand or with a mixture containing one or more plexands and antiplexes. In many cases, it will be found convenient to suspend a further supply of urea or thiourea crystals in the solution, handling it as a slurry.

As mentioned earlier, mixtures of cresylic acids containing substantial amounts of p-cresol are particularly effective. Typical of such mixtures are those used in Duo-Sol refining and customarily referred to as "Selecto" solvents. The latter comprise mixtures of cresylic acids, or cresols, and contain appreciable amounts of p-cresol. The amount of p-cresol in such mixtures varies widely, generally from about 5 to about 30 per cent, by weight. Other solvents effective herein comprise mixtures of phenol and cresylic acids, again with material quantities of p-cresol present. Representative of such mixtures is one comprising 60 per cent, by weight of phenol and 40 per cent, by weight of cresylic acids, the latter containing about 35 per cent, by weight, of p-cresol.

The solvent used is substantially inert to the hydrocarbons and/or hydrocarbon derivatives under treatment, and to urea of thiourea. It is heat stable, both alone and in contact with the hydrocarbons, hydrocarbon derivatives, urea and thiourea, at temperatures at which the desired plexad is not heat stable.

Cresylic acid mixtures can be used alone or with another solvent. It is often advantageous to utilize a two-component system, as water and mixtures of cresylic acids. Solvents other than water and the phenols mentioned above, suitable for use in a multiple-component system, include alcohols, glycols, ethers, amines, polyamines, amides, acids, nitriles, etc. Typical of such solvents are: methanol, ethanol, propanol, ethylene glycol, butylene glycols, ethylene glycol dimethyl ether, triethylamine, hexylamine, piperidine, diaminoethane, diaminopropane, diaminobutane, formamide, formic acid, acetic acid, acetonitrile, etc. Such multiple-component solvents, partially saturated to supersaturated with urea or thiourea, lend themselves readily to a continuous process for separation by plexation.

Solutions containing sufficient water in order to minimize the solubility of the hydrocarbons or hydrocarbon derivatives in the urea or thiourea solvent are often employed. The minimum quantity of water required depends upon the polarity and the molecular weight of the hydrocarbon or hydrocarbon derivative (or plexand) being treated and, in general, this quantity will be greater with more polar plexands and with lower molecular weight compounds.

It is also contemplated herein to include a small quantity of a surface active agent in the urea or thiourea solution, in the manner described in copending application Serial No. 115,437, filed concurrently herewith.

Another modification contemplated herein is the procedure described in copending application Serial No. 137,739, filed January 10, 1950, involving contact of hydrocarbons and/or hydrocarbon derivatives with a plexor impregnated upon a porous support. In this modification, the solvents used with the hydrocarbon and/or hydrocarbon derivatives will be mixtures of cresylic acids as described herein.

An understanding of a preferred embodiment of this invention may be facilitated by reference to the accompanying illustrative drawing, which is a schematic flow-diagram of one specific arrangement for practicing the invention.

In the figure, a mixture of hydrocarbons such as a waxy oil and a urea-cresylic acid solution, is introduced through line 1 to plexation tank 2. The mixture in tank 2 is agitated for a suitable period of time, generally from several minutes to about three hours, at a suitable temperature, for example 125° F., in order to realize a satisfactory degree of plexation. It will be understood that plexation tank 2 is equipped with a suitable stirrer or agitator (not shown). The resulting mixture is taken from tank 2 through line 3, naphtha in line 4 is added to the mixture in line 3, and the composite is introduced into separator 5. Naphtha, such as a fraction boiling at 200–300° F., is added to aid in separation of the urea-wax plexad, formed by plexation, and antiplexes of the waxy oil. The separator 5 can be a centrifuge, filter, settler equipped with a suitable screw conveyor, etc., as will be understood by those skilled in the art.

Antiplex hydrocarbons, or oils, in admixture with some naphtha and cresylic acids are withdrawn from separator 5 through line 6; and urea-wax plexad, in admixture with some naphtha and cresylic acids, is withdrawn through line 7. An additional quantity of naphtha is added through line 8 to the material in line 7, and the resulting material is introduced to a second separator, 9, wherein further classification takes place. In separator 9, antiplex hydrocarbons or oils are removed through line 10, and urea-wax plexad, together with some naphtha and cresylic acids, is withdrawn through line 11.

The urea-wax plexad, in line 11, is contacted with hot water (at about 150° F.) which is added through line 12, and passed through heat exchanger 13 to separator 14. The heat exchanger 13 is maintained at about 150° F., such that the urea-wax plexad is decomposed or resolved. Wax is removed from separator 14 through line 15 and is introduced into fractionator 16. Cresylic acids and naphtha removed through line 15 with the wax are taken to storage from fractionator 16 through lines 17 and 18, respectively, and wax is removed from the system through line 19. The wax so recovered can be further treated depending upon the use to which it is to be put.

Cresylic acids recovered in fractionator 16 and removed through line 17 are stored in tank 21, and can be recycled through line 1. Similarly, naphtha taken overhead from fractionator 16 through line 18 is stored in tank 22, and can be recycled, as through lines 4 and 8.

From separator 14, aqueous urea is taken through line 23 to a tower or still 24 wherein urea is concentrated. Water is removed from 24 through line 25, and a concentrated aqueous urea is removed through line 26 and is taken through cooler 27 to line 1 for reuse.

Hydrocarbon oils, antiplexes, in lines 6 and 10, are introduced into fractionator 28 wherein naphtha and cresylic acids admixed therewith are fractionated and are removed through lines 29 and 30, respectively. Recovered cresylic acids and naphtha are stored in tanks 21 and 22, respectively, and can be recycled as indicated above. Hydrocarbon oils, or dewaxed oils, are removed through line 31.

As shown above, a urea-wax plexad can be decomposed or resolved to urea and wax, under the influence of water and heat. Plexads, by definition, can be so resolved, under the influence of heat and/or certain solvents, such as methanol, ethanol, water and others mentioned above. It is to be understood, however, that urea and thiourea plexads behave differently in various solvents. For example, urea-wax plexads are soluble in isoamyl alcohol and in pyridine at temperatures of about 0–200° F., and do not decompose under such conditions; however, they are recovered from such solvents by evaporation.

VII. ILLUSTRATIVE EXAMPLES

The following examples serve to illustrate, and not in any sense limit, the present invention.

A residual lubricating oil stock having the following properties was used in the illustrative examples:

| | |
|---|---|
| Pour point, °F. | 80 |
| SUV @ 210° F., secs. | 75.9 |
| V. I. (approximate) | 103 |
| Color, Lovibond (¼″ cell) | 115 |
| Gravity, °A. P. I. | 28.5 |
| Flash, °F. | 450 |

One part of oil was mixed with 1.9 parts (by weight) of a cresylic acid mixture and 0.8 part (by weight) of urea at 125° F. (52° C.). The resulting mixture was maintained at 125° F. for ½ hour, and naphtha (200–300 F. boiling range) was added to aid in the separation of plexad and antiplex. The plexad thus formed, comprising hydrocarbon wax and urea, was separated from the mixture by filtration, and the plexad filter cake was washed with additional naphtha. The plexad was then washed with hot water (150° F.) to decompose the plexad, thereby setting free urea and molten wax. The hydrocarbon plexand, wax, was then separated by decantation. Similarly, the filtrate, or antiplex, was washed with hot water to remove urea therefrom, and naphtha was then removed by distillation.

Results of this example set forth in the following tabulation.

| | |
|---|---|
| Solvent | "Selecto"[1] |
| Plexation temp., °F. | 125 |
| Agitation, hrs. | ½ |
| Yields, per cent wt.: | |
| Wax removed | 5.0 |
| Oil remaining | 91.8 |
| Loss | 3.2 |
| Properties of wax—M. Pt., ASTM, °F. | 149.2 |
| Properties of oil remaining: | |
| P. Pt., °F. | 45 |
| SUV @ 210° F. | 80.8 |
| V. I. | 94 |
| Color | 165 |

[1] Comprises 60 parts, by weight, of phenol; 40 parts, by weight, of cresols (about 35% p-cresol).

Inspection of the foregoing results reveals that a mixture of cresylic acids is an excellent solvent in cooperating with urea to provide an oil of low pour point (45° F.) and to provide a hydrocarbon wax of high melting point.

The present process has considerable utility in resolving various hydrocarbon mixtures, as illustrated above. As a further example, this process is of value in conjunction with a "Duo-Sol" refining treat of oil stocks containing asphaltic materials. As is well known, "Duo-Sol" treats involve the use of a light hydrocarbon, particularly propane, in combination with phenols, generally phenol and cresylic acids, whereupon asphaltic materials are selectively separated from oil stocks. Inasmuch as these oil stocks contain waxes, in addition to asphaltic bodies, it is possible to integrate the present process with a "Duo-Sol" operation to effect removal of waxes. This is accomplished by a "Duo-Sol" treat in which a mixture of cresylic acids is used, followed by plexation in the presence of cresylic acid mixture. However, the advantage of integrating these operations resides in the feature of leaving the cresylic acids, in the "Duo-Sol" treated oil and effecting plexation. By leaving solvent in the raffinate, it is possible to dewax without first removing solvent before the dewaxing operation.

We claim:

1. In the refining of a residual lubricating oil stock containing hydrocarbon wax wherein said stock is contacted in solution with urea, whereby said hydrocarbon wax preferentially forms a crystalline complex with urea, and wherein said complex and the remaining oil stock are separated, the improvement which comprises: so contacting said oil stock and urea in solution in a mixture of cresylic acids, at a temperature of about 125° F.

2. In the refining of a residual lubricating oil stock containing hydrocarbon wax wherein said stock is contacted in solution with urea, whereby said hydrocarbon wax preferentially forms a crystalline complex with urea, and wherein said complex and the remaining oil stock are separated, the improvement which comprises: so contacting said oil stock and urea in solution in a phenolic mixture comprising about 60 weight per cent of phenol and about 40 weight per cent of cresols of which about 35 per cent is p-cresol, at a temperature of about 125° F.

3. The process for refining a hydrocarbon oil stock containing hydrocarbon wax and asphaltic materials, which comprises: treating said oil stock with a mixture of a light hydrocarbon and a mixture of cresylic acids, whereby an extract rich in asphaltic materials and a raffinate rich in hydrocarbon wax and containing cresylic acids are formed; separating said extract and raffinate; and contacting said raffinate with urea, at a temperature of about 125° F. whereby said hydrocarbon wax preferentially forms a crystalline complex with urea; and separating said complex and the remaining oil.

FRANKLIN L. DENNIS.
WILLIAM H. KING.
HAROLD C. MYERS.

References Cited in the file of this patent

UNITED STATES PATENTS

| Number | Name | Date |
|---|---|---|
| 1,830,859 | Schotte et al. | Nov. 10, 1931 |
| 2,017,432 | Bahlke | Oct. 15, 1935 |
| 2,499,820 | Fetterly | Mar. 7, 1950 |
| 2,520,715 | Fetterly | Aug. 29, 1950 |

OTHER REFERENCES

Technical Oil Mission, Reel 143, translation by Shell Development Co., of German patent application B 190,197, IV d 12, May 22, 1946, pages 2–6 only (5 pages).